Feb. 16, 1960    G. R. CHOPPIN ET AL    2,925,431
CATIONIC EXCHANGE PROCESS FOR THE SEPARATION OF RARE EARTHS
Filed April 17, 1956                     2 Sheets-Sheet 1
Fig. 1.
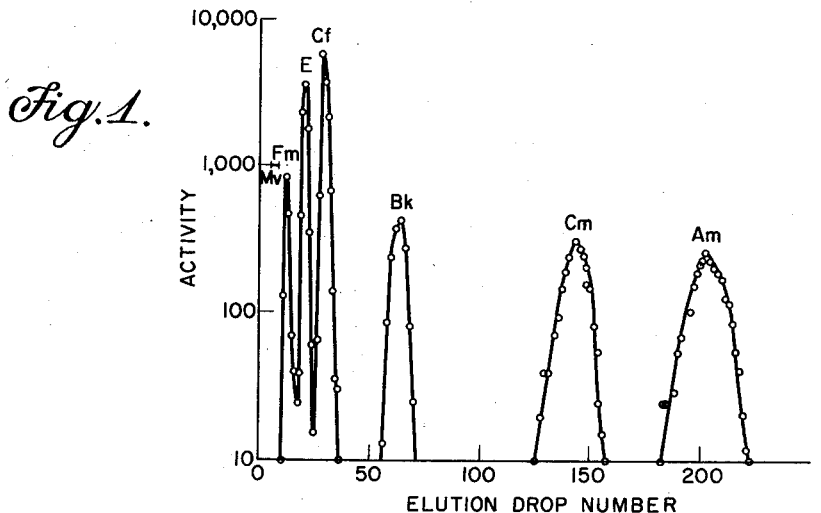
Elution of tripositive actinides from Dowex-50 with ammonium α-hydroxy-isobutyrate
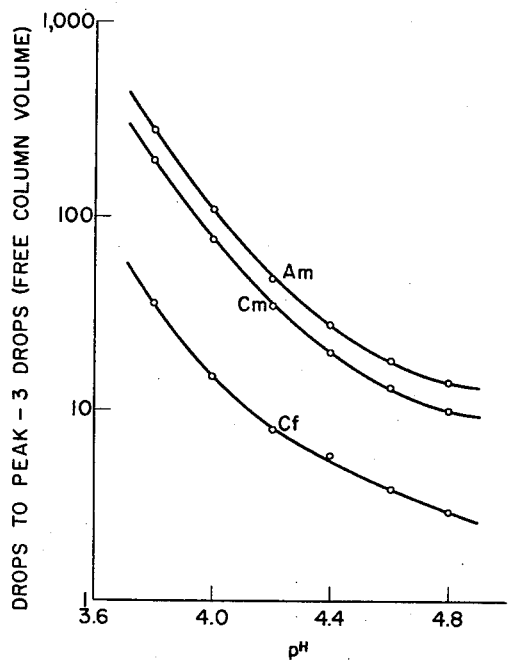
Elution peak positions versus pH of eluant
Fig. 2.
INVENTORS.
GREGORY R. CHOPPIN
STANLEY G. THOMPSON
BY BERNARD G. HARVEY
ATTORNEY.

United States Patent Office 2,925,431
Patented Feb. 16, 1960

2,925,431
CATIONIC EXCHANGE PROCESS FOR THE SEPARATION OF RARE EARTHS

Gregory R. Choppin, Berkeley, Stanley G. Thompson, Pleasant Hill, and Bernard G. Harvey, Berkeley, Calif., assignors to the United States of America as represented by the United States Atomic Energy Commission Application April 17, 1956, Serial No. 578,854

13 Claims. (Cl. 260—429.1)

The present invention relates, in general, to the separation and recovery of lanthanide and actinide elements and, more particularly, to a cationic exchange process wherein a superior eluant is employed to effect a more efficient and effective separation of such elements.

In recent years a variety of anionic and cationic resin exchange processes have been developed for the separation of rare earth elements. Prior to the advent of such processes, the separation of rare earth elements was an exceedingly difficult task, and the classical methods, such as fractional crystallization, required many years of operation to effect even incomplete separations.

Ordinarily, these ion exchange processes employ a column of ion exchange resin through which the rare earth elements are eluted with an appropriate fluid eluant solution in such a manner that each of the individual lanthanides collects into a discrete region along the column. As the elution proceeds such discrete region, i.e., chromatographic band, progresses through the column and the fraction of eluate or effluent containing the separated metal value finally emerges from the column and is collected.

In the cationic processes, developed heretofore, certain multi-functional organic acids, viz., citric, tartaric, glycolic, lactic, EDTA, in ammoniacal solutions, as well as other complexing agents, have been employed to effect selective or chromatographic elution. Under optimum conditions, the speed and degree of elutriative separation obtained with particular metal values are believed to be uniquely determined by certain inherent characteristics of the particular agent.

It has now been discovered that more effective separations and rapid elutions are obtainable in cationic exchange processes by employing aqueous solutions of ammonium alpha hydroxy isobutyrate as the eluant. More specifically, isobutyrate solutions of certain concentrations and having the acidity adjusted to certain pH values have been found to provide more selective separations and rapid elution of the lanthanide and actinide elements.

Accordingly, it is an object of the present invention to provide an improved cationic exchange process for the separation and recovery of metal values.

Another object of the invention is to provide an improved cationic exchange process for the separation and recovery of lanthanide and actinide metal ions.

Still another object of the invention is to provide a novel eluant which effects improved separations and rapid elution rates in the cationic exchange separations of the lanthanide and actinide elements.

A further object of the invention is to employ alpha hydroxy isobutyrate solutions for the selective elution of lanthanide and actinide elements.

A still further object of the invention is to provide pH, concentration and other conditions whereby alpha hydroxy isobutyrate solutions may be employed to effect the more selective and rapid elution of lanthanide and actinide elements through a cationic exchange resin column.

Other objects and advantages of the invention will become apparent on consideration of the following description taken in conjunction with the accompanying drawing, of which:

Figure 1 is a typical elution curve obtained in the elutriative separation of transplutonium elements using ammonium alpha hydroxy isobutyrate as the eluant;

Figure 2 is a graphical illustration of the effect on the elution of actinide elements obtained by varying the pH of an 0.4 M isobutyrate eluant solution;

Figure 3:
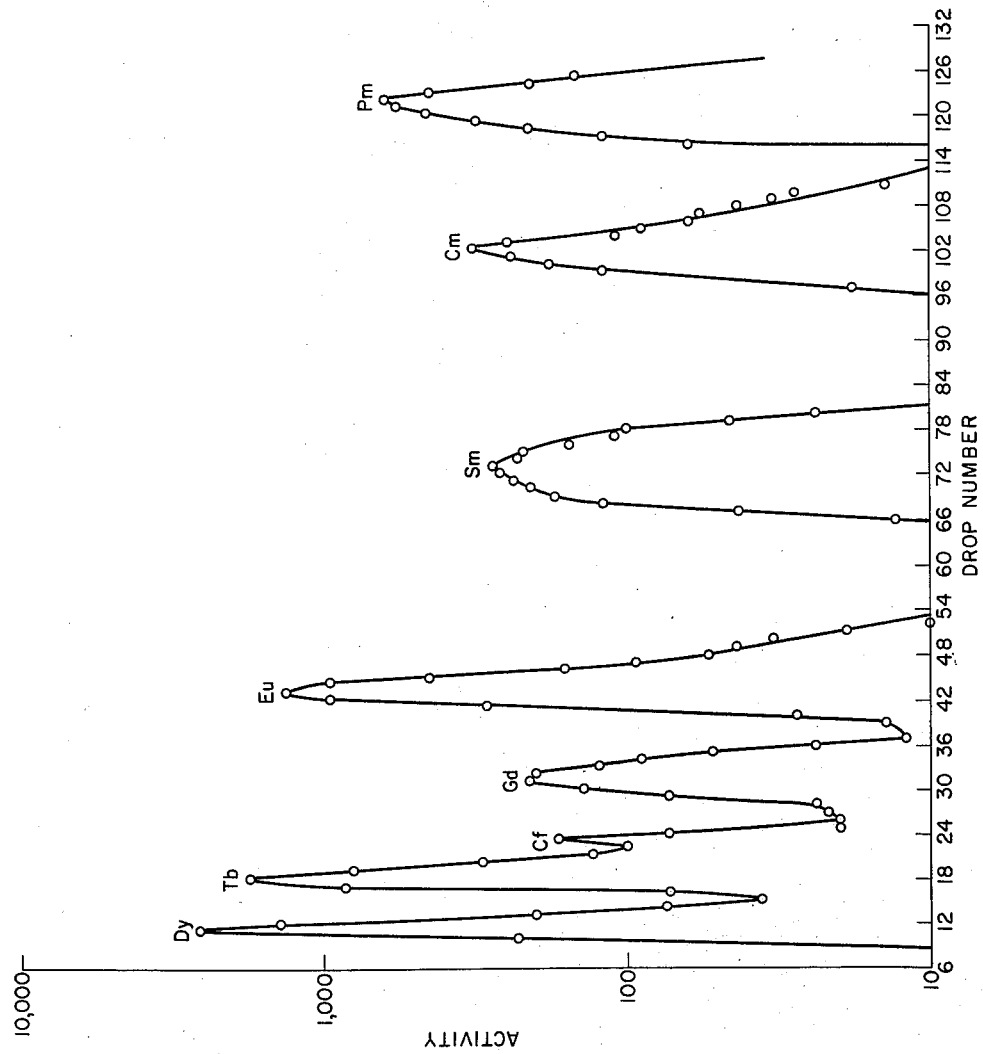
Figure 3 is a typical elution curve obtained in the elutriative separation of lanthanide and transplutonium ions.

Briefly, in accordance with the invention, the lanthanide and actinide elemental values to be separated are adsorbed in a limited region in the upper portion of an elongated column of cationic exchange resin. Subsequently, an aqueous solution of ammonium alpha hydroxy isobutyrate of an appropriately adjusted concentration and pH is flowed through the column at a rate regulated to effect the chromatographic elution of the elements whereby the separated value appears in a fraction of the effluent eluate.

More particularly, various mixtures of lanthanide and actinide elements from either natural or synthetic sources may be separated by treatment in the process of the invention. The lanthanide rare earth elements may be either the mixtures commonly found in natural ores or they may be the radioactive species which are produced in nuclear fission and other nuclear disintegration and synthesis processes. The actinide elements will include the natural isotopes of uranium and the lower actinides as well as the radioactive actinides including the transuranium elements which are generally produced by nuclear reactions.

It is essential to note that the best separations of the lanthanides and actinides is obtained with the materials in a trivalent and tripositive ionic state. The lower actinide elements, i.e., plutonium and the lower atomic number actinide elements, generally yield solutions in which the ions exist in other ionization states which behave in a somewhat different fashion from those which form stable tripositive ions in solution. While certain of these materials, e.g., uranium in the $U^{+4}$ state may be separated in the process, others, e.g., plutonium do not form ions with a stable oxidation state and the plutonium peak may be "smeared" over several positions. Accordingly, for greater purification it is desirable to separate the lower atomic number actinides as a group from the transplutonium and lanthanide rare earths which may then be separated in the process of the invention. Several conventional methods may be employed for this purpose; however, a group separation by means of anionic exchange is most convenient. In such an anionic exchange group separation process, the original material is dissolved in an acidic solution, e.g., 4–8M HCl or another mineral acid in which the lower actinides exist in an anionic state while the higher actinides and lanthanides exist in a cationic state. The solution is then contacted with an anion exchange resin, preferably, a highly basic anionic exchange resin, such as Dowex 1, Amberlite IRA–400, etc., to adsorb said anions therefrom and leave the cations in the effluent. If desired the adsorbed materials can be eluted selectively from the anionic exchange resin or separated by other conventional processes.

Generally, as the first operation in the process of the invention the group separated or other mixture of elemental values is treated to produce therefrom an aqueous solution in which they exist in a cationic resin adsorbable tripositive ionic state. Excellent adsorption of the trivalent ions of the metal values is obtained from low concentration hydrochloric acid solutions, i.e., solutions of about 0.01 to 0.1 M HCl concentration. Somewhat more concentrated acid solutions (up to about 0.5 M HCl) can also be employed; however, it is then necessary to pass ammonium chloride solution through the column to restore the resin to the ammonium form.

Adsorption of the materials in a limited region in the upper portion of the column is accomplished either by contacting the solution with a portion of resin in a separate container or by passing the solution in limited volume slowly through the column and washing the residual solution from the column with additional dilute HCl. In any event there is first produced an adsorbate of the metal values in the resin column.

Highly acidic mono functional cationic exchange resins are suitable for use in the present process. Sulfonated organic materials, and in particular, sulfonated polymeric resins such as the commercially available Dowex 50 and Nalcite HCR cation exchange resins, converted to the ammonium form, are preferred for use in the column. Such resins comprise a sulfonated polystyrene polymer which has been cross-linked with a divinyl-aromatic hydrocarbon included in the polymerization mixture. More specifically, Dowex 50 is a sulfonated aromatic hydrocarbon of the type described by D'Alelio in U.S. Patent 2,366,007. Further information and description of such cation exchange resin is presented commencing on page 2830, vol. 69, of the Journal of the American Chemical Society, 1947.

To obtain the more complete separations, the column diameter, i.e., cross sectional area of resin in the column is selected so that only a limited column length is necessary to accommodate the total quantity of adsorbed metal ions. The column length is made sufficient to achieve desired separations. Ordinarily, a column temperature in the region of 90° C. yields somewhat more rapid elutions and better separations; however, operation at as low as 25° C. has been found to yield separations decreased by a factor of only about 10%, with the present elutriant system. With small columns, small particle size resin, i.e., 200–400 mesh, is preferred while large particle sizes may be employed in larger columns and with larger amounts of the metal ions.

The eluant solutions of the invention may be characterized as being acidic ammoniacal solutions of alpha hydroxy isobutyric acid. For most purposes the concentration of the organic acid in the eluant may range from about 0.1 M to about 0.6 M and the pH may range from a value of about 3.8 to about 5.0, as obtained by adjustment with ammonia. Generally speaking the concentration of free isobutyrate ion, which exists at the respective and interrelated concentrations of complexing agent and pH of the elutriant solution, determines the volume of elutriant required for elution of the individual element. The isobutyrate is most efficiently employed in the pH range indicated above. Moreover, operation with the pH adjusted to a value within the range of about 4.2 to 4.8 will decrease the pH sensitivity of the system and operation in this pH range is preferred. Adjustment of the isobutyrate concentration as described more fully hereinafter may be employed to regulate the elution rates and degree of separation.

Two factors, which occur also in conventional operations, must be borne in mind in selecting operating conditions for separating particular combinations of rare earth elements. If a number of easily eluted elements occur in admixture with slowly eluted rare earths, it will often be found that the eluant concentrations and pH conditions which yield reasonably rapid elutions of the slow materials, do not permit effective separation of the easily eluted materials. Likewise, conditions which permit effective separations of the easily eluted materials require excessive volumes of eluate for elution of the slow materials. Accordingly, the elutriant of the invention, which characteristically yields sharper separations at higher flow rates, is found to permit separation of such mixtures in more reasonable time periods.

Three interrelated equilibria are concerned in the exchange processes which occur in the chromatographic elution of the character disclosed herein corresponding to the following equations:

(a) $M^{+3} + 3R^- \rightleftarrows MR_3$
(b) $M^{+3} + nX^- \rightleftarrows MX_n^{3-n}$
(c) $NH_4^+ + R^- \rightleftarrows NH_4R$ wherein $R^-$ = active resin site
$X^-$ = organic chelating or complexing ion
$M^{+3}$ = lanthanide or actinide ion During the elution the adsorbed metal ions undergo many exchanges between the resin and aqueous phases, whereby the ions of the individual metals collect into discrete bands which progress in a characteristic sequence through the column. Finally the separated metal value appears in a discrete fraction of the effluent from which it may be recovered or converted into purified compounds by conventional procedures. If the effluent fractions are collected in small increments and the metal content determined by assay, a plot of the results vs. the volume of solution will give an "elution curve" in which the fractions containing the separated metal values are indicated as elution peaks.

To simplify consideration of the principal features of the invention, reference will now be made to the experimental results obtained utilizing tracer amounts of lanthanide and transplutonium elements under standardized conditions. It will be appreciated, however, that the indicated methods, results and conditions are applicable to the separation of larger amounts by the application of appropriate scaling factors and the elimination of certain refined procedures which are required only for precise operation.

Since only micro quantities of materials, on a weight basis, were involved, a jacketed column having a diameter of 2 mm. was sufficient to prevent overloading of the column area while a length of about 5 to 6 cm. of resin was sufficient to obtain excellent separations. Dowex 50X–12 spherical resin (400+ mesh) in the hydrogen form was graded by allowing the material to settle from aqueous suspension. The fraction settling at a rate between 0.5 and 0.25 cm./min. (corresponding to the finer fractions) was collected and washed alternately with 12 M HCl and ammonia. The washed material was stored in the ammonium form until used.

For use, the resin was transferred to the column as an aqueous slurry to provide the indicated bed length and the column was heated to 87° C. by refluxing trichlorethylene within the jacket; however, preliminary experiments indicated that operation at 25° C. did not decrease separation factors more than 10%. Eluant solution was flowed through the column at a slow rate (ca. 5 min. per drop) with stirring to eliminate gas bubbles to equilibrate the column. The column was ready for use as soon as gas formation ceased; however, eluant flow was continued for 24 hours to eliminate all soluble inorganic materials from the resin.

Immediately before use eluant flow was stopped, eluant removed from the column and the column washed with hot, deaerated distilled water to remove last traces of the eluant. Finally two drops of water were forced through the resin, the procedure repeated with two drops of hot 0.05 M HCl and the supernatant acid was removed from the space above the resin bed.

The mixture of elements to be separated, dissolved as the tripositive ionic state in two drops of 0.05 M HCl, was transferred to the top of the column and the solution allowed to flow through the column to adsorb the mixture of metal ions on the resin. The adsorbate was washed with two drops of 0.05 M HCl flowed down the upper wall portions and through the column. Subsequently, the washing was repeated with two drops of water to assure complete transfer of the metal ions to the resin. Finally two drops of the eluant were flowed slowly through the column to establish initial elution conditions, i.e., reconvert the resin to the ammonium form and remove the water.

Elution was effected by connecting a reservoir of eluant to the upper portion of the column, while assuring total displacement of air and the flow rate was adjusted by regulating the elevation of the reservoir relative to the column. Flow rates used here are conveniently indicated in drops per minute. While increasing the flow rate did not materially increase the volume of eluant required to elute a given ion, the width of the bands were increased with the more rapid flow rates. It is therefore necessary to employ a flow rate compromised between the requirements of speed and the completeness of the separation. As a practical matter, with the types of materials treated herein, separations were so complete that there was little object in operating at flow rates less than 0.5 ml./min./cm.$^2$. At flow rates of above about 4 ml./min./cm.$^2$ (i.e., 15 seconds per drop from the standard 2 mm. diameter resin bed) the products collected as individual drops accumulated faster than they could be conveniently dried, ignited and radioactively assayed.

With the indicated apparatus arrangement it is convenient to collect the product fractions as individual drops of effluent and to determine the volume of eluant required for elution in drop units. The first drop which emerged from the column, after transfer to the eluant, being considered drop one, etc. The activity or metal content of the fraction can then be plotted along the ordinate scale against the drop number (volume) along the abscissa scale to illustrate the characteristics of the separation achieved. The full width of the elution peak at half maximum is then a measure by which flow rate may be determined to effect desired sharpness of separation. Moreover, respective peak separation factors may be calculated from the data after subtraction of the free column volumes with reference, for example, to the volume required for the elution of a reference element, e.g., gadolinium or curium as indicated hereinafter.

Transplutonium fractions of actinide elements were separated in a 5 cm. x 2 mm. column using 0.4 M ammonium α-hydroxy isobutyrate solution at a flow rate of 1.0 ml./min./cm.$^2$ as the eluant under conditions described in the foregoing. A typical elution curve obtained by plotting the activity of each drop relative to the drop number of separated fractions of the eluant is illustrated in Fig. 1 of the drawing.

The effect produced by varying the pH of the eluant using an 0.4 M solution was determined from a number of runs, at various pH values, for several of the transplutonium elements with the results illustrated in Fig. 2 of the drawing. Moreover, separation factors ($a_0$) were calculated as a ratio of the elution peak positions measured in drops relative to the number of drops to the curium peak, the free column volume being subtracted from each volume, as tabulated below: Data for glycolate and lactate under comparable conditions are also presented.

Table I

| Element | Eluant Anion | | α-Hydroxy-isobutyrate |
|---|---|---|---|
| | Glycolate | Lactate | |
| 101$^{Mv}$ | | | 0.05 |
| 100$^{Fm\ 1}$ | | 0.23 | 0.07 |
| 99$^{E\ 2}$ | | 0.33 | 0.13 |
| 98$^{Cf}$ | 0.60 | 0.41 | 0.20 |
| 97$^{Bk}$ | 0.70 | 0.65 | 0.45 |
| 96$^{Cm}$ | 1.00 | 1.00 | 1.00 |
| 95$^{Am}$ | 1.14 | 1.21 | 1.45 |

1 Fermium.
2 Einsteinium.

The greater peak spacings for the isobutyrate elutions of the transplutonium elements is readily apparent from the table.

Separation factors were also determined for the lanthanide elements at a flow rate of 1.0 ml./min./cm.$^2$ and with a column operating temperature of 87° C. The large separation factors obtained made it necessary to perform a number of elutions using various combinations of three to five adjacent lanthanides. The eluants ranged from 0.2 M alpha hydroxy isobutyric acid adjusted to pH 4.0 with ammonia for lutetium-ytterbium-thulium separations to 0.4 M acid, pH 4.6, for neodymium-praseodymium-cerium-lanthanum.

In performing the elutions, the pH necessary to elute an ion with a desired volume of eluant was estimated, for a 0.4 M solution of isobutyrate, from a pH vs. drop number curve, similar to that of Fig. 2, by using the separation relative to curium. To minimize the effect of pH fluctuations in the system it was desirable to operate in the pH range of 4.2 to 4.8. If for a particular separation the curve indicated the choice of an 0.4 M solution having a pH below about 4.2 isobutyrate concentrations of 0.3 M or 0.2 M were used instead. Then the acid constant expression was used to calculate the pH necessary to give the same isobutyrate ion concentration as that indicated by the curve since it is the free isobutyrate ion concentration which actually determines the elution volume. The value for $K_a$ at 25° C. ($10^{-3.96}$) can be employed for this calculation.

Lanthanide separation factors, together with the separation factor for curium, relative to gadolinium, are tabulated below:

Table II

| Element | $a_0$ | Element | $a_0$ |
|---|---|---|---|
| La | 34.10 | Tb | 0.49 |
| Ce | 16.70 | Dy | 0.20 |
| Pr | 10.45 | Ho | 0.16 |
| Nd | 6.60 | Er | 0.13 |
| Pm | 4.10 | Tm | 0.10 |
| Sm | 2.25 | Yb | 0.075 |
| Eu | 1.40 | Lu | 0.055 |
| Gd | 1.00 | Y | 0.25 |
| | | Cm | 3.45 |

By indexing the values for curium in Tables I and II, supra, the elution order and peak separations for the lanthanides and transplutonium actinides may be determined.

The probable experimental error in the above indicated separation factors is of the order of 5%. A value for the constant $a_0$ which is less than 1.00 means that the corresponding rare earth precedes gadolinium or curium, the reference element, in the elution and a value larger than 1.00 means that the metal value follows the reference element. Accordingly, the sequences indicated in the foregoing and following tables are the sequence in which any series of the lanthanides and actinides will appear in the elution fractions. This order is the same as that found heretofore when using a lactate eluant.

The relative efficacy of the alpha hydroxy isobutyric acid eluant of the invention and ethylenediamine tetracetic acid (EDTA), citric acid and lactic acid solutions are presented in Table III. The tabulated data are for flow rates which yield a 10% value for the full width at half maximum of the elution peaks and the data for the three comparison materials are that given by S. W. Mayer and E. C. Freiling, J. Am. Chem. Soc. 75, 5647 (1953).

Table III

| Rare Earth | .026 M EDTA, 0.4 ml./min./cm.$^2$ | .5 M citrate, 0.4 ml./min./cm.$^2$ | .24 M Lactate, 3.5 ml./min./cm.$^2$ | .3 M Isobuyrate, 2.0 ml./min./cm.$^2$ |
|---|---|---|---|---|
| Sm | 1.00 | 1.00 | 1.00 | 1.00 |
| Eu | 1.57 | 1.20 | 1.28 | 1.60 |
| Tb | 5.18 | 1.87 | 2.22 | 4.60 |
| Y | | 2.56 | 4.08 | 9.00 |

It will be observed that the indicated values for isobutyrate are about equivalent to those for EDTA; however, the flow rate for the former is five times as large. This data is for the band elution method rather than the band displacement method usually employed with EDTA. The solubility of the lanthanum salt of alpha hydroxy isobutyric acid was determined to be 70 g./l. (0.5 N) at 19° C. and pH 5.8 which is greater than the reported solubility of the lanthanum salt of EDTA. These considerations suggest that the elutriant of the invention may be superior to EDTA even for the band displacement method.

A mixture of lanthanides and transplutonium elements was adsorbed on a 5 x 0.2 cm. column of the type described above. Elution was then performed using 0.4 M alpha hydroxy isobutyric acid which was adjusted to pH 3.9 with ammonia. A flow rate of 1.0 ml./min./cm.², at 87° C., was employed during the elution. Fractions were collected dropwise, evaporated and ignited and then the activity was determined by standard counting techniques. The results of this elution are illustrated in Fig. 3 of the drawing. As a point of explanation, the large half width of the samarium peak is attributable to the presence of macro amounts thereof.

Among the advantages apparent in the foregoing and which are forthcoming through the use of ammonium alpha hydroxy isobutyrate solutions as eluants are the following:

(1) Greater separative spacing of the elution peaks.
(2) Sharper elution peaks even at higher flow rates.
(3) Decreased elution times.
(4) Higher peak to valley ratios thereby effecting greater purification of the product.

While there have been described what may be considered to be preferred embodiments of the invention, modification may be made therein without departing from the concept of the invention and it is intended to cover all such as fall within the scope of the appended claims.

What is claimed is:

1. In a process for separating lanthanide and actinide metal values the steps comprising producing an adsorbate of said values in a trivalent oxidation state in a cationic exchange resin column, and selectively eluting said values from the resin column by contact with an acidic aqueous solution of ammonium alpha hydroxy isobutyrate.

2. In a process for separating lanthanide and actinide metal values, the steps comprising producing an aqueous solution containing said values in a tripositive cationic state, adsorbing said metal values on a cation exchange resin column, and eluting the metal values from said column by contact with an acidic solution of ammonium alpha hydroxy isobutyrate, whereby said values are separated and appear in discrete fractions of the eluate.

3. In a process for separating lanthanide and actinide metal values, the steps comprising producing an acidic aqueous solution of said metal in a tripositive cationic state, contacting said solution with a cationic exchange resin column to adsorb the metal values thereon, flowing an aqueous solution of ammonium alpha hydroxy isobutyrate having a pH in the range of about 3.8 to 5.0 through said column to chromatographically elute the metal values which then appear in separate fractions of the effluent eluate, and collecting the fractions containing the separated metal values.

4. In a process for separating lanthanide and actinide metal values, the steps comprising producing an acidic aqueous solution of said metals in a tripositive cationic state, contacting said solution with a cationic exchange resin column to adsorb the metal values thereon, flowing an aqueous solution of ammonium alpha hydroxy isobutyrate having a concentration in the range of about 0.1 M to 0.6 M and a pH in the range of about 3.8 to 5.0 through said column to chromatographically elute the metal values which then appear in separate fractions of the effluent eluate, and collecting the fractions of eluate containing the separated metal values.

5. In a process for separating lanthanide and transplutonium actinide metal values from a mixture thereof, the steps comprising producing an acidic aqueous chloride solution of said values in a tripositive cationic state, adsorbing said metal values on a cationic exchange resin column, chromatographically eluting said metal values from the column with an aqueous ammonium alpha hydroxy isobutyrate solution having a concentration in the range of about 0.1 to 0.6 M and a pH in the range of about 3.8 to 5.0, whereby the metal values are separated and appear in individual effluent fractions of the eluate, and collecting the individual fractions of eluate containing the separated metal values.

6. The process as defined in claim 5 wherein said acidic chloride solution comprises HCl of about 0.01 to 0.1 M concentration.

7. In a process for separating lanthanide and actinide metal values, the steps comprising separating the actinides having an atomic number at least as large as that of plutonium from the mixture, then producing an acidic aqueous chloride solution of the residual values existing in a tripositive cationic state in the solution, adsorbing said metal values on a cationic exchange resin column, chromatographically eluting said metal values from the column with an aqueous ammonium alpha hydroxy isobutyrate solution having a concentration in the range of about 0.1 to 0.6 M and a pH in the range of about 3.8 to 5.0, whereby the metal values are separated and appear in individual effluent fractions of the eluate, and collecting the individual fractions of eluate containing the separated metal values.

8. In a process for separating lanthanide and transplutonium actinide metal values, the steps comprising producing an acidic aqueous chloride solution of said values in the tripositive cationic state, contacting said solution with a column of cationic exchange resin in the ammonium form to adsorb the metal values thereon, chromatographically eluting said metal values from the column with an aqueous ammonium alpha hydroxy isobutyrate solution having a concentration in the range of about 0.1 to 0.6 M and a pH in the range of about 3.8 to 5.0, whereby the metal values are separated and appear in individual effluent fractions of the eluate, and collecting the individual fractions of eluate containing the separated metal values.

9. The process as defined in claim 8 wherein said pH is in the range of 4.2 to 4.8, whereby the pH sensitivity of the elutriant system is diminished.

10. In a process for separating and recovering lanthanide and actinide elements wherein there is produced an adsorbate thereof in a cationic exchange resin column, the step comprising selectively eluting ions of said elements from the resin in the tripositive ionic state with an eluant comprising an acidic aqueous solution of ammonium alpha hydroxy isobutyrate to produce individual effluent eluate fractions containing the selectively eluted and separated ions of said elements.

11. The process as defined in claim 10 wherein the concentration of the isobutyrate is in the range of about 0.1 to 0.6 M.

12. The process as defined in claim 11 wherein the concentration of the isobutyrate is in the range of about 0.1 to 0.6 M and the pH of the eluant is in the range of about 3.8 to 5.0.

13. The process as defined in claim 11 wherein the concentration of the isobutyrate is in the range of about 0.1 to 0.6 M and the pH of the eluant is in the range of 4.2 to 4.8.

(References on following page)

References Cited in the file of this patent

UNITED STATES PATENTS

| | | |
|---|---|---|
| 2,743,154 | Kaufman et al. | Apr. 24, 1956 |
| 2,770,520 | Long et al. | Nov. 13, 1956 |

FOREIGN PATENTS

| | | |
|---|---|---|
| 639,265 | Great Britain | June 28, 1950 |

OTHER REFERENCES

Strut et al.: "The Separation of Americium and Curium From the Rare Earth Elements," Journal of American Chemical Society, vol. 72, page 2790 (1950.)

AEC Document 3517, "An Ion Exchange Study of Possible Hybridized 5f Bonding in the Actinides," 44 pages, Aug. 28, 1951.

Physical Review, vol. 98, pages 1518, 1519, "New Element Mendelevium," Atomic Number 101, received Apr. 18, 1955, published June 1, 1955.

Amer. Chem. Soc. Jour., vol. 76, pp. 6229–6236, Dec. 20, 1954.

Liderer: "Separation of Rare-Earth Elements," Nature, 176 pages, September 3, 1955, pages 462–463.

UCRL–3209, "Ion-Exchange Behavior of Actinides and Lanthanides," Sures, 61 pages, January 1956.

UCRL–3265, "Separation of Lanthanide and Actinides by Ion Exchange With Alpha-Hydroxy Isobutyric Acid," Chopin and Silva, Jan. 20, 1956.